United States Patent Office 2,844,506
Patented July 22, 1958

2,844,506
FUNGICIDAL COMPOSITIONS

Roy H. Jenkins, Jr., Wilmington, Del., assignor to Hercules Powder Company, Wilmington, Del., a corporation of Delaware No Drawing. Application March 16, 1955
Serial No. 494,802

5 Claims. (Cl. 167—30)

The present invention relates to fungicidal compositions and to a method for protecting materials against fungicidal attack. More particularly, it relates to fungicidal compositions comprising an active fungicide selected from the group consisting of lower alkyl benzoic acids and the copper and zinc salts thereof, and a fungicidal adjuvant therefor, and to a method of preserving a material normally susceptible to fungicidal attack which comprises applying said composition thereto.

Many materials both in industry and agriculture are susceptible to microbiological decomposition. For many years such microbiological decomposition has been combated by the application to the materials of chemicals having fungicidal properties. Although it is known in the art that some carboxylic acids and many different copper and zinc compounds have fungicidal properties, the art has no reliable guide from which to predict the behavior of a previously untested compound as a fungicide.

In accordance with the present invention, it has been found that the lower alkyl-substituted benzoic acids, preferably those substituted in the para position, and the copper and zinc salts of such acids have strong fungicidal properties which render them useful as fungicides for both industrial and agricultural purposes. The invention thus provides a fungicidal composition comprising an active fungicide including a lower alkyl-substituted benzoic acid or a copper or zinc salt thereof, and a fungicidal adjuvant therefor. The invention also provides a process of preserving materials normally susceptible to fungicidal attack which comprises applying a minor amount of the composition of the invention to the material.

In order to further illustrate the invention, the following examples are presented. Parts and percentages are by weight unless otherwise specified.

In the examples, reference is made to certain recognized tests. These include:

(1) The standard agar plate test employing *Aspergillus niger* as the test fungus;

(2) The tomato early blight test in which Bonny Best tomato plants are sprayed with the test composition and then sprayed with a spore suspension of *Alternaria solani*;

(3) A spore germination assay following the procedure described in "Phytopathology" 37, 354–6 (1947) using *Alternica oleracea* and *Monolina fructicola* as test fungi.

Alphabetical ratings in this test refer to the effective dosage to prevent germination of 50% of the spores and are as follows:

| Rating | | $ED_{50}$ in p. p. m. |
|---|---|---|
| 1 or less | AA | |
| 1 to 10 | A | |
| 10 to 100 | B | |
| 100 to 1000 | C | |
| Over 1000 | D | |

The compositions employed in the several tests are prepared in various ways. In the agar plate test, 0.3 part of the active fungicide is dissolved in 39 parts of acetone and the solution is then mixed with sufficient sterile melted mineral salts agar to give a 300 p. p. m. concentration. Compositions of different concentration are prepared by appropriate adjustment in weight of active fungicide.

In the tomato early blight test, 0.4 part of the active fungicide is added to 200 parts of water containing 200 p. p. m. of "Tween 20." The mixture is then violently agitated to form a suspension of 0.2% concentration.

In the spore germination assay, 0.2 part of the active fungicide is dissolved in 7.9 parts of acetone and the solution is added to 190 parts of water containing 200 p. p. m. of "Tween 20." Aliquot portions of the resulting stock solution of 1000 p. p. m. concentration are then diluted with water to provide solutions of the concentrations required for testing.

EXAMPLE 1

Twelve parts of sodium hydroxide was dissolved in 500 parts of water and 82 parts of cumic acid was then dissolved in the solution with agitation. The solution was then filtered to remove insoluble impurities. To the alkaline solution of cumic acid there was then added a solution of 33 parts of zinc acetate $[Zn(C_2H_3O_2)_2]$ in 250 parts of water. The resulting precipitate was isolated by filtration and air dried. It amounted to 50 parts and was identified as zinc cumate.

The zinc cumate was next formulated into various compositions, as previously described, and subjected to tests. The results of the tests are as follows:

*Agar plate test*

| Dosage Level (p. p. m.) | Percent Inhibition of *A. niger* |
|---|---|
| 100 | 45 |
| 300 | 95–100 |

*Tomato early blight test*

Disease index, 3.9

*Spore germination assay*

| *A. oleracea* | *M. fructicola* |
|---|---|
| B, B | B, B |

EXAMPLE 2

Eighty-two parts of cumic acid was dissolved in 3000 parts of water containing 20 parts of sodium hydroxide. To this solution was added a solution of 99.5 parts of copper acetate $[Cu(C_2H_3O_2)_2]$ and 1000 parts of water. A light blue precipitate formed. After filtering and air drying, there was obtained 108 parts of a light blue powder.

This powder which was identified as copper cumate was next subjected to tests for the determination of its fungicidal properties. The test data are as follows:

*Agar plate test*

| Dosage Level (p. p. m.) | Percent Inhibition of *A. niger* |
|---|---|
| 100 | 60 |
| 300 | 95–100 |

*Tomato early blight test*

Disease index, 2.1

*Spore germination assay*

| A. oleracea | M. fructicola |
|---|---|
| B, B | B, B |

EXAMPLE 3

Fifty parts of p-toluic acid was dissolved in 500 parts of water containing 14 parts of sodium hydroxide. The solution thus formed was mixed with a solution of 40 parts of zinc acetate in 300 parts of water. The precipitate that formed was filtered and air dried and identified as zinc p-toluate. It was next subjected to tests for determination of fungicidal activity. The data are as follows:

*Agar plate test*

| Dosage Level (p. p. m.) | Percent Inhibition of $A.\ niger$ |
|---|---|
| 100 | 55 |
| 300 | 100 |

*Spore germination assay ratings*

| A. oleracea | M. fructicola |
|---|---|
| B, B | C, B |

EXAMPLE 4

Fifty parts of p-toluic acid was dissolved in 500 parts of water containing 14 parts of sodium hydroxide. To this solution there was added with stirring a solution of 45 parts of copper sulfate ($CuSO_4 \cdot 5H_2O$) and 250 ml. water. The precipitate that formed was filtered out and air dried. It analyzed 11.3% copper.

The precipitate was tested for fungicidal activity in the agar plate test. The data obtained are as follows:

| Dosage Level (p. p. m.) | Percent Inhibition of $A.\ niger$ |
|---|---|
| 100 | 100 |
| 300 | 100 |

EXAMPLE 5

Cumic acid was tested for fungicidal activity in the agar plate test. The data are as follows:

| Dosage Level (p. p. m.) | Percent Inhibition of $A.\ niger$ |
|---|---|
| 100 | 40 |
| 300 | 100 |

EXAMPLE 6 p-Toluic acid was tested for fungicidal activity in the agar plate test. The data are as follows:

| Dosage Level (p. p. m.) | Percent Inhibition of $A.\ niger$ |
|---|---|
| 100 | 95 |
| 300 | 100 |

EXAMPLE 7

The copper salt of mixed toluic acids comprising 30% p-toluic acid and 70% m-toluic acid was prepared according to the procedure of Example 4 by substituting mixed toluic acids for p-toluic acid. The resulting copper salt was tested in the agar plate test. The data are as follows:

| Dosage Level (p. p. m.) | Percent Inhibition of $A.\ niger$ |
|---|---|
| 100 | 65 |
| 300 | 95–100 |

EXAMPLE 8

The zinc salt of mixed toluic acids comprising 30% p-toluic acid and 70% m-toluic acid was prepared according to the procedure of Example 4 by substituting the mixed toluic acids for p-toluic acid. The resulting zinc salt was tested in the agar plate test. The data are as follows:

| Dosage Level (p. p. m.) | Percent Inhibition of $A.\ niger$ |
|---|---|
| 100 | 45 |
| 300 | 70 |

EXAMPLE 9

The zinc salt of p-tert-butyl benzoic acid was prepared according to the procedure of Example 1 by substituting p-tert-butyl benzoic acid mole for mole for cumic acid. The resulting salt was subjected to a spore germination assay. The ratings are as follows:

| A. oleracea | M. fructicola |
|---|---|
| C | B |

EXAMPLE 10

The copper salt of p-tert-butyl benzoic acid was prepared according to the procedure of Example 2 by substituting p-tert-butyl benzoic acid mole for mole for cumic acid. The resulting salt was subjected to a spore germination assay. The ratings are as follows:

| A. oleracea | M. fructicola |
|---|---|
| B | B |

EXAMPLE 11

Each of the active fungicides of Examples 1 to 10 was dissolved in acetone and applied to a strip of bleached muslin to provide a concentration of active fungicide of about 1.0% based on the muslin. The strips resulting from this treatment were then buried, along with an untreated strip of muslin, in moist mushroom soil.

After 2 weeks had elapsed, the strips were removed from the soil. The untreated strip had substantially disintegrated but the treated strips possessed nearly their original strength.

As can be seen from the preceding examples, lower alkyl benzoic acids, i. e., benzoic acids substituted by an alkyl group of 1 to 4 carbon atoms, and the copper and zinc salts of such acids possess strong fungicidal properties which render them useful for the protection of a number of materials from attack by fungi. The standard agar plate test involving the fungus $A.\ niger$ gives a direct quantitative indication of the value of these acids and salts in protecting materials such as wood, fabric, rope, jute and paper from attack by fungi. Other tests such as the tomato early blight test and the spore germination assay are directly indicative of the value of the compounds as agricultural fungicides. The compounds have also been found to be nonphytotoxic so that their use in fungicidal compositions for agricultural purposes does not harm the plants to which they are applied.

Because the lower alkyl benzoic acids and their copper and zinc salts cannot be used conveniently for fungicidal purposes in concentrated form, the fungicidal compositions of the invention are produced by admixing one of these active fungicides with a suitable adjuvant which is an inert material to facilitate the mechanical distribution of the acid or salt. More specifically, inert materials to facilitate the mechanical distribution of the active fungicide are added for the purposes outlined in Frear (Chemistry of Insecticides, Fungicides and Herbicides by Donald E. H. Frear, second edition, 1948, page 5) to form sprays, dusts and aerosols. Surface-active dispersing agents are used in admixture with the active fungicide to promote its spreading and thereby improve its effectiveness. Such agents are used in both aqueous sprays and dusts. Solvents such as deodorized kerosene, etc. are also used in sprays as the sole inert material to facilitate the mechanical distribution of the active fungicide.

Suitable active dispersing agents for use in the composition of the invention are those described in Frear, supra, pages 280–7, for use with known fungicides, and includes soaps of resin, alginic and fatty acids, and alkali metals or alkali amines or ammonia, gelatins, milk, soluble casein, flour and toluble proteins thereof, long chain fatty alcohols having 12–18 carbon atoms and alkali metal salts of sulfates thereof, salts of sulfated fatty acids, esters of long chain fatty acids and polyhydric alcohols having free hydroxy groups, and clays such as Fuller's earth, china clay, kaolin, bentonite and related hydrated aluminum silicates having the property of forming a colloidal gel.

Compositions of the lower alkyl benzoic acid or copper or zinc salt thereof and surface-active dispersing agent will, in some instances, have more than one dispersing agent for a particular type of utility or, in addition to a surface-active dispersing agent, hydrocarbons such as kerosene and mineral oil can be added as improvements. Thus, the lower alkyl benzoic acid or salt thereof may contain a clay as a sole adjuvant or clay and hydrocarbon, or clay and another surface-active dispersing agent to augment the dispersing action of the clay. Mixtures of the latter type are known in the art as wettable powders and are often dispersed in water prior to application to the material to be protected.

The compositions preferably comprise from about 0.001 to 10% by weight of active fungicide.

For many purposes, it may be desirable to use the compositions of the invention in combination with other fungicidal compositions or active fungicides.

In the preservation of fabric, cordage, etc., the compositions are preferably applied to the material to be protected in an amount to provide a concentration of active fungicide of about 0.1 to 10% based on the weight of the material. In agricultural use, the compositions are preferably applied in an amount to provide a concentration of active fungicide of about 0.1 to 50 pounds per acre. Optimum concentrations within the above ranges will vary depending primarily on the specific nature of the use.

What I claim and desire to protect by Letters Patent is:

1. A process of preserving a material normally susceptible to fungicidal attack which comprises applying to the material a minor amount of a fungicidal composition comprising an active fungicide selected from the group consisting of the copper and zinc salts of para-substituted lower alkyl benzoic acids and a fungicidal adjuvant therefor.

2. The process of claim 1 in which the active fungicide is copper cumate.

3. The process of claim 1 in which the active fungicide is zinc cumate.

4. The process of claim 1 in which the active fungicide is copper p-toluate.

5. The process of claim 1 in which the active fungicide is zinc p-toluate.

References Cited in the file of this patent

UNITED STATES PATENTS 2,614,963    Elson _____ Oct. 21, 1952

OTHER REFERENCES

Houben, Joseph: Fortschritte der Heilstoffchemie, 2. Abteilung, II. Band, "41. Methyl-Benzoesäuren, Toluylsäuren" (p. 391 relied on).

UNITED STATES PATENT OFFICE

CERTIFICATE OF CORRECTION

Patent No. 2,844,506                                            July 22, 1958

Roy H. Jenkins, Jr.

It is hereby certified that error appears in the printed specification of the above numbered patent requiring correction and that the said Letters Patent should read as corrected below.

Column 1, line 61, for "Monolina", in italics, read -- Monolinia -- in italics; lines 65 to 71, the table should appear as shown below instead of as in the patent:

| Rating | $ED_{50}$ in p. p. m. |
|--------|-----------------------|
| AA     | 1 or less             |
| A      | 1 to 10               |
| B      | 10 to 100             |
| C      | 100 to 1000           |
| D      | over 1000             | column 5, line 31, for "toluble" read -- soluble --.

Signed and sealed this 23rd day of September 1958.

(SEAL)
Attest:

KARL H. AXLINE

Attesting Officer

ROBERT C. WATSON

Commissioner of Patents